ns Literature of the
United States Patent [19]

Barsotti

[11] 4,411,951

[45] Oct. 25, 1983

[54] HIGH SOLIDS COATING COMPOSITION OF AN ENAMEL CONTAINING A RHEOLOGY CONTROL ADDITIVE OF SILICA AND POLYETHYLENE GLYCOL

[75] Inventor: Robert J. Barsotti, Franklinville, N.J.

[73] Assignee: E. I. Du Pont de Nemours & Co., Wilmington, Del.

[21] Appl. No.: 403,304

[22] Filed: Jul. 30, 1982

[51] Int. Cl.$^3$ ............................ C08K 3/36; C08K 5/06; C08G 61/28
[52] U.S. Cl. ..................................... 428/328; 428/525; 524/377; 524/441; 524/493; 524/512
[58] Field of Search ............... 524/377, 492, 441, 493, 524/512; 428/328, 525

[56] References Cited

U.S. PATENT DOCUMENTS

| | | | |
|---|---|---|---|
| 3,607,822 | 9/1971 | Nishino | 260/37 |
| 3,630,954 | 12/1971 | Yates | 252/313 S |
| 3,873,485 | 3/1975 | Fichera | 260/29.2 EP |
| 3,959,554 | 5/1976 | Hick | 428/336 |
| 3,979,540 | 9/1976 | Moffet | 428/414 |
| 4,066,599 | 1/1978 | Zimmerman | 260/30.6 R |
| 4,120,835 | 10/1978 | Goodell | 428/460 |
| 4,131,571 | 12/1978 | Crawley et al. | 428/464 |
| 4,157,994 | 6/1979 | Totty et al. | 524/512 |
| 4,164,488 | 8/1979 | Gregorovich et al. | 524/512 |
| 4,210,571 | 7/1980 | Herman | 260/40 R |
| 4,210,572 | 7/1980 | Herman et al. | 260/40 R |
| 4,238,387 | 12/1980 | Antonelli et al. | 260/42.29 |
| 4,273,695 | 6/1981 | Greene et al. | 428/462 |
| 4,276,212 | 6/1981 | Khanna et al. | 525/384 |
| 4,330,458 | 5/1982 | Spinelli et al. | 525/108 |
| 4,338,379 | 7/1982 | Strolle et al. | 524/512 |
| 4,353,949 | 10/1982 | Kyminas et al. | 428/195 |

FOREIGN PATENT DOCUMENTS 52-58732  5/1977  Japan .................................. 524/512

OTHER PUBLICATIONS

"Cab-O-Sil in Coatings"-Suppliers Literature of the Cabot Corporation, pp. 1-17.
Derwent Abst. 83431 C/47, Oct. 1980, (J55129463) Shikoku.
Derwent Abst. 56603 Y/32, Jun. 1977, (J52077136), Dai-Nippon Toryo.
Derwent Abst. 00841 E/01, Dec. 1981, (J56155227), Asahi Glass.
Derwent Abst. 94506 X/51, Dec. 1976, (DT2524309), Liepmann.
Derwent Abst. 32023 C/18, Mar. 1980, (J55040717), Shikoku.
Derwent Abst. 40326 C/23, Apr. 1980, (J55054358), Shinetsu.
Chem. Abs. 93-96958n Shinetsu, (J50-54358), Oct. 1978.
Chem. Abs. 91-93111d Nakajima et al., (J79-43237), Sep. 1977, Shikoku.
Chem. Abs. 84-123518s, (J80161529) or (J78036853).
Nishizawa et al., (Derwent Equiv. 79308A/44).

Primary Examiner—Melvyn I. Marquis
Assistant Examiner—Herbert J. Lilling
Attorney, Agent, or Firm—Hilmar L. Fricke

[57] ABSTRACT

The coating composition useful as the exterior finish on automobiles and trucks contains about 40-60% by weight of a binder of film-forming constituents and 30-60% by weight of a non-aqueous carrier; the binder is an film-forming resin containing reactive hydroxyl, carboxyl, amide, glycidyl groups or any mixture of such groups and an alkylated melamine formaldehyde crosslinking resin, in addition the composition contains about 0.1-10% by weight, based on the weight of the binder, of a rheology control additive of
  (1) colloidal silica and
  (2) a polyethylene glycol having a weight average molecular weight of about 800-400,000.

18 Claims, No Drawings

HIGH SOLIDS COATING COMPOSITION OF AN ENAMEL CONTAINING A RHEOLOGY CONTROL ADDITIVE OF SILICA AND POLYETHYLENE GLYCOL

BACKGROUND OF THE INVENTION

This invention relates to a high solids coating composition and in particular to such a composition containing a rheology control additive.

Conventional coating compositions of a high molecular weight acrylic polymer and melamine crosslinking resins are well known in the art as shown by Vasta U.S. Pat. No. 3,622,651, issued Nov. 23, 1971; Hick U.S. Pat. No. 3,841,895, issued Oct. 15, 1974; Parker U.S. Pat. No. 3,674,734, issued July 4, 1972 and Parker U.S. Pat. No. 3,637,546, issued Jan. 25, 1972. These patents illustrate high quality coating compositions but have a relatively high solvent content to provide for good application properties and good properties of the resulting dried finish. To utilize these compositions in areas which have strict air pollution regulations, pollution abatement equipment is required. This equipment is expensive and increases capital investment of a plant and is costly to operate. Any attempt to reduce the solvent content of these conventional compositions generally results in finishes which have either a poor appearance or unacceptable properties or both.

In an effort to obtain high solids coating compositions that can be applied by conventional spraying techniques, the molecular weight of the polymer used in these compositions was reduced substantially and solvent content of the coating compositions was reduced. The reduction in molecular weight caused a problem of poor appearance, sagging of the finish on application, pulling away from edges after application and cratering of the finish. When aluminum flake pigments were used in these composition, poor appearance was caused by improper orientation of the aluminum flake in the finish.

There is a great need for a rheology control additive for high solids coating compositions that provides a reduced viscosity under typical spraying conditions when the coating composition is applied and that provides a substantially increased viscosity after application which prevents sagging of the resulting finishes. Also, the additive should reduce pulling away of the finish from edges after application and should provide proper orientation of metallic flakes used in the coating. High solids coating compositions containing such an additive will have an overall appearance that is acceptable for exterior finishes of automobiles and trucks.

SUMMARY OF THE INVENTION

The coating composition comprises about 40–70% by weight of a binder of film-forming constituents and 30–60% by weight of a non-aqueous liquid carrier; the binder comprises a film-forming resin containing reactive hydroxyl groups, carboxyl groups, amide groups, glycidyl groups or any mixture of such groups and an alkylated melamine formaldehyde crosslinking agent; additionally, the composition contains about 0.1–10% by weight, based on the weight of the binder, of a rheology control additive which consists essentially of about (1) 80–99.5% by weight, based on the weight of the rheology control additive, of colloidal hydrophilic silica and (2) 0.5–20% by weight, based on the weight of the rheology control additive, of polyethylene glycol having a weight average molecular weight of about 800–400,000.

DESCRIPTION OF THE INVENTION

The high solids coating composition has a binder content of film-forming constituents of about 40–70% by weight. Generally, the composition has a binder content of about 50–65%. The composition contains about 30–60% by weight of a liquid carrier which generally is solvent for the binder. In addition, the composition contains 0.1–10% by weight, based on the weight of the composition, of a rheology control additive of colloidal silica and polyethylene glycol. Optionally, the composition contains about 0.1–30% by weight, based on the weight of the composition, of pigment.

The rheology control additive contains about 80–99.5% by weight, based on the weight of the additive, of colloidal silica. Preferably, the colloidal silica is hydrophilic and has a particle size of about 0.2–1000 millimicrons and a surface area of about 50–1200 square meters per gram. The silica is usually about 99.8% silicon dioxide by weight (on a moisture free basis) and exists in three dimensional branched chain aggregates and has a surface that is hydrophilic and capable of hydrogen bonding.

One particularly preferred silica is a colloidal fumed silica with a hydrophilic surface having a surface area of about 100–500 square meters per gram and a nominal particle size (assuming spherical particles) of about to 5–20 millimicrons.

The rheology control additive contains in addition to the silica about 0.5–20% by weight of polyethylene glycol having a weight average molecular weight of about 800–400,000. One preferred polyethylene glycol has a weight average molecular weight of about 6,000–10,000.

One preferred rheology control additive contains about 94–98% by weight of colloidal fumed silica with a hydrophilic surface and a surface area of about 100–500 square meters per gram and 2–6% by weight of the above described preferred polyethylene glycol.

Adducts of polyethylene glycol also can be used such as a polyethylene glycol/polypropylene oxide adduct, ethoxylated alcohols such as polyethylene glycol ether of a secondary alcohol, ethoxylated alkylphenols such as polyethylene glycol ether of nonyl phenol, ethoxylated amides such as ethoxylated alkylol amides, ethoxylated amines such as ethoxylated tallow amine, ethoxylated fatty acids such as polyethylene glycol monooleate, ethoxylated fatty esters such as polyethylene oxide oleo ether, and ethylene oxide/methyl methacrylate copolymers.

Another aspect of this invention is the use of high molecular weight polyethylene glycols or adduct thereof having a weight average molecular weight of about 100,000–400,000 with hydrophobic silica to form a rheology control additive. Typically useful hydrophobic colloidal silicas have a surface area of about 100–500 square meters per gram and have at least two-thirds of the surface groups reacted with dimethyl siloxane. One preferred rheology control additive contains about 94–98% of this hydrophobic silica and 2–6% by weight of polyethylene glycol as adducts thereof within the aforementioned molecular weight range.

The advantages of high solids coating compositions that contain the rheology control additive are as follows: the composition can be sprayed at a high solids level without sagging and running on the substrate to which it was applied; upon baking of the composition after application, the finish does not pull away from the edges of the substrate; the resulting finish has excellent gloss and a good appearance; when metallic flakes are used in the composition, the flakes are properly oriented and uniformly dispersed in the finish with a good two tone image and with little or no evidence of mottling caused by agglomeration of the metallic flakes and the rheology control additive is stable in the composition.

The binder of the composition preferably is an acrylic polymer having carboxyl groups, hydroxyl groups, amide groups glycidyl groups or a mixture of any of these groups and preferably has a number average molecular weight of about 500-30,000 and a melamine crosslinking agent. Generally, the composition contains about 0.1-2.0% by weight based on the weight of the binder of an acid catalyst.

The high solids coating composition containing the rheology control additive can have as the binder of film-forming constituents the following: a blend of the aforementioned acrylic polymer and a polyester resin and an alkylated melamine formaldehyde crosslinking agent, hydroxy terminated polyester resins and the above crosslinking agent, epoxy resins or epoxy ester resins and the above crosslinking agent, alkyd resins with or without drying oil groups and the above crosslinking agents.

Typically useful acrylic polymers that can be used in the composition are of an alkyl methacrylate, alkyl acrylate, hydroxy alkyl acrylate, hydroxy alkyl methacrylate and can contain styrene, acrylic acid or methacrylic acid. Amide monomers such as methacrylamide and acrylamide can be used, glycidyl monomers such as glycidyl acrylate or glycidyl methacrylate can also be used.

Preferred acrylic polymers are of an alkyl methacrylate that has 1-18 carbon atoms in the alkyl group, an alkyl acrylate that has 2-18 carbon atoms in the alkyl group and a hydroxy alkyl acrylate or a hydroxy alkyl methacrylate each having 2-4 carbon atoms in the alkyl group. To form an acrylic polymer which has a hydroxyl content of about 2-10% by weight, a sufficient amount of the aforementioned hydroxy alkyl acrylate or methacrylate is utilized. The polymer also can contain small amounts of ethylenically unsaturated carboxylic acid, such as acrylic acid, methacrylate acid, itaconic acid, in amounts of about 0.1-5% by weight.

Typical alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate and the like.

Adhesion promoting monomers can also be used in the acrylic polymers such as diethyl aminoethyl methacrylate, tertiary butyl aminoethyl methacrylate, 3-(2-methacryloxy ethyl)-2,2-spiro cyclohexyl oxazolidene and the like.

Typical hydroxy alkyl acrylates and methacrylates which can be used to prepare the acrylic polymers are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, and the like.

The acrylic polymers can contain about 0.1-30% by weight of other constituents such as acrylonitrile, methacrylonitrile, acrylamide and methacrylamide, styrene or substituted styrene such as methyl styrene.

The acrylic polymers utilized in the coating composition are prepared by solution polymerization in which the monomers are blended with solvent, polymerization catalyst and optionally, a chain transfer agent, and heated to about 75°-150° C. for 1-6 hours to form a polymer that preferably has a number average molecular weight of about 500-30,000, a hydroxyl content of 2-10% by weight and a glass transition temperature of about −20° C. to +25° C.

To form films that have acceptable physical properties from these relatively low molecular weight acrylic polymers, the polymers generally have a hydroxyl content that is about two to three times higher than acrylic polymers used for conventional thermosetting compositions. The higher hydroxyl content provides additional crosslinking sites and films are formed that have excellent physical properties that are equivalent to and often better than films from conventional thermosetting acrylic compositions.

The number average molecular weight of the acrylic polymers is determined by gel permeation chromatography using polymethylmethacrylate as a standard.

The glass transition temperature of the polymers is determined by differential scanning colorimetry or is calculated.

One technique that is successfully used in preparing the acrylic polymers is a programmed addition of monomers, solvent, catalyst solution and optionally a chain transfer agent into a polymerization vessel at a given rate. These programmed additions can be manually calculated or calculated by a computer. This allows for the molecular weight. Optionally, the polymers can be terminated with the chain transfer agent at the desired low molecular weight. Also, if required, after the polymerization is completed, solvents can be stripped off to increase the polymer solids content of the resulting polymer solution.

Typical solvents which are used to prepare the acrylic polymer are the following: toluene, ethyl acetate, acetone, methyl isobutyl ketone, methyl amyl ketone methyl ethyl ketone, ethyl alcohol, mineral spirits, ethylene glycol monoethyl ether acetate, and other aliphatic, cycloaliphatic and aromatic hydrocarbons, esters, ethers, ketones, and alcohols. These solvents can also be used to reduce the resulting coating composition to a spray viscosity.

About 0.1-4% by weight, based on the weight of the monomers, of the polymerization catalyst is used to prepare the acrylic polymer. Typical catalysts are: azo-bis-isobutyronitrile, azo-bis(gamma dimethyl valeronitrile), benzoyl peroxide, t-butyl pivalate and the like.

A chain transfer agent can be used to control the molecular weight of the acrylic polymer. Typical chain transfer agents are 2-mercapto ethanol, dodecyl mercaptan, benzene thioethanol, mercapto succinic acid, butyl mercaptan, lauryl mercaptan, mercapto propionic acid and the like. When a transfer agent is used, the resulting acrylic polymer contains about 0.5-10% by weight of a chain transfer agent.

An alkylated melamine formaldehyde crosslinking resin is used in the composition. The alkylated melamine formaldehyde resin used generally has 1-4 carbon atoms in the alkyl group. The resin is prepared by conventional techniques in which an alcohol such as methanol, ethanol, propanol, isopropanol, butanol, isobutanol, tertiary butanol and the like is reacted with a melamine formaldehyde resin. The resin can be monomeric or polymeric. One preferred resin which gives a high quality finish is hexamethoxymethyl melamine. Another useful resin is a methoxy/butoxymethyl melamine.

One particularly preferred high solids coating composition comprises about 40-70% by weight of a binder of film-forming constituents and a non-aqueous liquid carrier; in which the binder of film-forming constituents consist essentially of (A) about 5-45% by weight of a medium molecular weight acrylic polymer having a number average molecular weight, determined by gel permeation chromotography, of about 5,000-20,000, a hydroxyl content of about 2%-10% by weight, a glass transition temperature of about −20° C. to +25° C. and consists essentially of an alkyl methacrylate that has 1-18 carbon atoms in the alkyl group, a hydroxy alkyl acrylate, or a hydroxy alkyl methacrylate each having 2-4 carbon atoms in the alkyl group, and optionally, an alkyl acrylate that has 2-18 carbons in the alkyl group or styrene and (B) about 10-50% by weight of a low molecular weight acrylic polymer having a number average molecular weight determined as above of about 500-7,500, a hydroxyl content of about 2%-10% by weight, a glass transition temperature of about −20° C. to +25° C. and consists essentially of an alkyl methacrylate that has 1-18 carbon atoms in the alkyl group, a hydroxy alkyl acrylate, or a hydroxy alkyl methacrylate each having 2-4 carbon atoms in the alkyl group, and optionally, an alkyl acrylate that has 2-18 carbons in the alkyl group or styrene;

wherein the difference in molecular weight between the acrylic polymers is at least 3000; and (C) 25-45% by weight of alkylated melamine formaldehyde cross-linking resin having 1-4 carbon atoms in the alkyl group; and in addition to the above film-forming constituents contains about 0.1-2.0% by weight of an acid catalyst.

Useful acrylic polymers for this preferred composition contain about 15-82% by weight of an alkyl methacrylate that has 1-4 carbon atoms in the alkyl group, preferably methyl methacrylate, 2-50% by weight of an alkyl acrylate that has 2-12 carbon atoms in the alkyl group and 16-35% by weight of a hydroxyl alkyl acrylate or a hydroxyl alkyl methacrylate each having 2-4 carbon atoms in the alkyl group. These polymers can contain up to 30% by weight of styrene which replaces a portion of the alkyl methacrylate. Also these polymers can contain an ethylenically unsaturated carboxylic acid.

Particularly useful acrylic polymers for this preferred composition comprises about 10-20% by weight styrene, 10-20% by weight methyl methacrylate, 35-48% by weight butyl acrylate, 20-30% by weight hydroxy ethyl acrylate and 0.1-5% by weight of acrylic acid and have a number average molecular weight of 1,500-10,000. Preferred acrylic polymers of the above type contain about 16% styrene, 15.8% methyl methacrylate, 43% butyl acrylate, 25% hydroxy ethyl acrylate and 0.2% acrylic acid. Another useful acrylic polymer contains abut 29% styrene, 21% methyl methacrylate, 32% butyl acrylate, 17% hydroxy ethyl acrylate and 1% acrylic acid.

Preferred medium molecular weight acrylic polymers have a number average molecular weight of about 5,000-10,000 and low molecular weight acrylic polymers have a number average molecular weight of about 1,500 to 4,000.

The composition can contain pigments. These pigments can be introduced into the composition by first forming a mill base with the polymer utilized in the composition or with other compatible polymers or polymeric dispersants by conventional techniques, such as sand-grinding, ball milling, attritor grinding, two roll milling to disperse the pigments. The mill base is blended with the film-forming constituents as shown in the following Examples.

Any of the conventional pigments used in the coating compositions can be utilized in this composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

Metallic flake pigments such as aluminum flakes are used alone or with the aforementioned pigments in the coating compositions. Generally, about 0.1-5% by weight, based on the weight of the binder, of these metallic flake pigments are used.

Also, in addition to the above constituents, plasticizers in the amounts of 0.1-10% by weight, based on the weight of the binder, can be used in the composition. Plasticizers that can be used, are for example, butyl benzyl phthalate, dibutyl phthalate, triphenyl phosphate, 2-ethylhexyl benzyl phthalate, dicyclohexyl phthalate, diallyl phthalate, dibenzyl phthalate, butylcyclohexyl phthalate, mixed benzoic acid esters, fatty oil acid esters of pentaerythritrol, poly-(propylene adipate)dibenzoate, diethylene glycol dibenzoate, tetrabutylthiodisuccinate, butylphthalylbutyl glycolate, acetyltributyl citrate, dibenzylsebacate, tricresyl phosphate, toluene ethyl sulfonamide, and dimethylene cyclohexyl phthalate.

An acid catalyst solution can be added to the coating composition to increase the rate of crosslinking of the composition on curing. Generally, about 0.1-2% by weight, based on the weight of the binder, of acid catalyst is used. For example, phosphoric acid or an alkyl acid phosphate in which the alkyl groups has 1-12 carbon atoms can be utilized for this purpose. Typical alkyl acid phosphates are methyl acid phosphate, ethyl acid phosphate, propyl acid phosphate, lauryl acid phosphate, and the like. Sulfonic acid or a substituted sulfonic acid can be used such as para-toluene sulfonic acid.

Adducts of the aforementioned acids also can be used as catalysts. For example, epoxy resins reacted with phosphoric acid or an alkyl acid phosphate or with a substituted sulfonic acid such as paratoluene sulfonic acid are useful. Typical epoxy resins that can be used to form these adducts are "Epon" 828, 1002, 1003, 1004 which are the condensation products of epichlorohydrin and bisphenol A. Other compounds can be used to form adducts of these acids such as alkyl oxazolidine, e.g., dimethyl oxazolidine.

To improve weatherability of finishes of the coating composition, about 0.1–10%, by weight, based on the weight of the binder, of an ultraviolet light stabilizer or a combination of ultrviolet light stabilizers can be added. Also, about 0.1–5% by weight, based on the weight of the binder, of an antioxidant can be added. Weatherability of finishes of coating compositions containing aluminum flake are particularly enhanced by the addition of ultraviolet light stabilizers and antioxidants. Also, about 0.1–10% by weight, based on the binder, of iron pyrophosphate can be added with ultraviolet light stabilizers and antioxidants to improve weatherability of finishes. Typically useful ultraviolet light stabilizers and antioxidants are disclosed hereinafter.

The coating composition of this invention can be applied over a variety of substrates, such as metal, wood, glass, plastics, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are baked at relatively low temperatures of about 65°–140° C. for about 15 minutes, 2 hours. The resulting finish is about 0.1–5 mils thick but for most uses, a 1–3 mil thick finish is used. One technique that is used to insure that there will be no popping or cratering of the finish is to allow the solvents to flash off for about 15–30 seconds before a second coating is sprayed on or otherwise applied, then waiting from about 2–10 minutes before baking the coating to allow any residual solvents to flash off. The resulting finish has good gloss and can be rubbed or polished with conventional techniques to improve the smoothness, appearance and gloss. The finish has good adhesion to substrates of all types, is hard and resistant to weathering, solvents, alkali, scratches and the like. These characteristics make the composition particularly useful as a finish for automobiles, trucks, airplanes, railroad equipment machines, outdoor equipment such as bridges, water tanks, gas tanks and the like.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention containing pigments in a pigment to binder ratio of about 1/100 to 150/100 and other additives.

Optionally, the color coat can contain about 0.1–10% by weight, based on the weight of the binder of the color coat, of an ultraviolet light stabilizer. Another option is that the color coat and the clear coat each can contain about 0.1–10% by weight, based on the weight of the binder of the coat, of an ultraviolet light stabilizer. Also, the clear coat or the color coat can contain about 0.1–5% by weight, based on the weight of the binder of the coat, of an antioxidant. When an antioxidant is used, the ratio of ultraviolet light stabilizer to antioxidant is about 1:1 to about 50:1.

Preferred, to form a durable finish, both the clear coat and the color coat contain about 5–8% by weight of an ultraviolet light stabilizer and optionally, about 0.1–1% by weight of the antioxidant and the ratio of ultraviolet light stabilizer to antioxidant is about 10:1.

Iron pyrophosphate can be added to either the clear coat or color coat or both in the aforementioned amounts to enhance weatherability of the clear coat/color coat finish.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–1.5 mils thick. Any of the aforementioned conventional pigments can be used in the color coat including metallic flake pigments can be used. The clear coat can also contain transparent refractive index as the binder of the clear coat and are of a small particle size of about 0.015–50 microns. Typical pigments that can be used in a pigment to binder weight ratio of about 1/100 to silica pigments. These pigments have a refractive index of about 1.4–1.61.

Typical ultraviolet light stabilizers that are useful are as follows:

Benzophenones such as hydroxy dodecyloxy benzophenone, 2,4-dihydoxybenzophenone, hydroxybenzophenones containing sulfonic groups and the like.

Triazines such as 2-phenyl-4-(2',4'-dihydroxylbenxoyl)-triazoles,2-[hydroxyl-3',5'-(1,1-dimethylpropyl)-phenyl]benzotriazole, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl) benzene, metal derivatives of 3,5-di-t-butyl-4-hydroxy phenyl propionic acid, asymmetrical oxalic acid diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Typical antioxidants that are useful are as follows: tetrakis alkylene (di-alkyl hydroxy aryl)alkyl ester alkanes such as tetrakis methylene 3(3',5'-dibutyl-4'hydroxyphenyl)propionate methane, reaction product of p-amino diphenylamine and glycidyl methacrylate, reaction product of n-hexyl-N'-phenyl-p-phenylene diamine and glycidyl methacrylate, pentaerythritol tetrakis-(thioglycolate), trimethylol propane tris(thioglycolate), trimethylol ethane tris-(thioglycoate), N-(4-anilino phenyl) acrylamide and the like.

One preferred combination of ultraviolet light stabilizer and antioxidant is 2-hydroxy-4-dodecyloxy benzophenone or a substituted 2(2-hydroxyphenyl) benzotriazole and tetrakis methylene 3(3',5'-dibutyl-4'hydroxyphenyl) propionate methane.

The clear coat/color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following examples illustrate the invention. All parts and percentages are on a weight basis unless otherwise indicated. Molecular weights are determined by gel permeation chromatography.

EXAMPLE 1

A white paint was formulated by blending together in a conventional mixing vessel the following constituents in the order shown:

|  | Parts By Weight |
|---|---|
| Ultraviolet light stabilizer solution (25% solid of 2-[2,-hydroxy-3',5'-(1,1-dimethylpropyl)phenyl] benzotriazole) | 5.75 |
| Xylene | 2.68 |
| Ethyl Acetate | 5.46 |
| Hydrophilic Silica Dispersion (8.9% fumed colloidal hydrophilic silica having a surface area of 200 square meters per gram and an average diameter of 120 millimicrons, 49% of a fully methylated/butylated melamine formaldehyde resin 42.1% by weight of ethylene glycol monobutyl ether) | 6.70 |
| White Pigment Dispersion (70% titanium dioxide pigment, 14% acrylic resin described below, 16% methyl amyl ketone) | 27.31 |
| Modaflow solution (10% solids of an acrylic polymer of ethylacrylate/ 2-ethyl hexyl acrylate xylene) | 0.31 |
| Fully methylate/butylated melamine formaldehyde resin | 13.40 |
| Acrylic resin solution (75% solids in methyl amyl ketone in which the acrylic polymer is of styrene, methylmethacrylate, n-butyacrylate, hydroxy ethyl acrylate, acrylic acid in a weight ratio of about 29/21/32/17/1 having a number average molecular weight of about 6000) | 36.34 |
| Methanol | 0.60 |
| Polyethylene glycol solution (10% solids in methanol of polyethylene glycol having a weight average molecular weight of about 8,000) | 0.21 |
| Dimethyl oxazoline solution (65% solids in methanol) | 0.44 |
| Paratoluene sulfonic acid solution (33% solids in methanol) | 0.88 |
| Total | 100.08 |

The above white paint was reduced to a 40 second Fisher No. 2 cup viscosity with a mixture of xylene and ethyl acetate. The reduced paint was electrostatically sprayed with a Minibell electrostatic Spray Gun on a phosphatized steel panel coated with an alkyd resin primer and baked for 30 minutes at about 125° C. The resulting paint had a high gloss, a dry paint film thickness of about 2 mils and did not sag or pull away from the edge of the panel.

A second coating of the resulting paint was sprayed onto a separate phosphatized and primed steel panel and baked as above to provide a film about 3.5 mils thick which had excellent gloss, did not sag or pull away from the edges of the panel.

A white paint was prepared using the same constituents and amounts as above except the polyethylene glycol solution was omitted. The paint was reduced to a spray viscosity as above, spray applied as above onto a separate steel panel phosphatized and primed as above and baked as above to provide a 2 mil thick finish. The resulting panel had an unacceptable finish because the finish showed severe pulling away from the edges of the panels and sagged. A thick film (3.5 mils dry film thickness) was applied as above to a separate primed and phosphatized steel panel and had the same unacceptable properties including excessive sagging of the finish.

EXAMPLE 2

A dark blue metallic paint was formulated by blending the following constituents together in the order shown in a mixing vessel.

|  | Parts by Weight |
|---|---|
| Xylene | 3.65 |
| Butyl acetate | 1.41 |
| Ethyl acetate | 3.70 |
| Amyl acetate | 7.47 |
| U.V. stabilizer and Antioxidant solution (24.2% of 2-[2'-hydroxy-3', 5'-(1,1-dimethylpropyl)phenyl] benzotriazole, 0.8% tetrakis[methylene 3-(3',5'-di-t-butyl-4'-hydroxyphenyl) propionate]methane and 75% toluene) | 6.48 |
| Blue Pigment Dispersion (8.50% phthalocyanine blue pigment, 55.78% acrylic polymer described in Example 1 and 36.72% methylamyl ketone) | 11.19 |
| Violet Pigment Dispersion | 2.58 |
| Hydrophilic Silica Dispersion described in Example 1) | 5.89 |
| Fully methylated/butylated melamine formaldehyde resin | 15.67 |
| Iron pyrophosphate dispersion (22.2% iron pyrophosphate 39.64% acrylic polymer described in Example 1, 33.16% methyl amyl ketone) | 3.53 |
| Medium coarse Aluminum Flake Dispersion (24% aluminum flake, 33.81% medium molecular weight acrylic resin - described below, 38.16% methyl amyl ketone) | 0.35 |
| Medium Aluminum Flake Dispersion (25% aluminum flake 30.27% acrylic resin above and 44.73% methyl amyl ketone) | 0.12 |
| Medium Molecular Weight Acrylic Resin solution (60% solids acrylic resin of styrene, methyl methacrylate, butyl acrylate, hydroxy ethyl acrylate, acrylic acid in a weight ratio of 29/21/32/17/1 having a number average molecular weight of 15,000 in a mixture of solvents of aliphatic solvent, butanol, ethylene glycol monoethyl ether acetate and butyl acetate) | 12.72 |
| Acrylic resin solution (75% solids of acrylic described in Example 1) | 21.35 |
| Polyethylene glycol solution (described in Example 1) | 0.18 |
| Methanol | 2.00 |
| Dimethyl Oxazoline solution (65% solids in methanol) | 0.35 |
| Paratoluene sulfonic acid solution (33% solids in methanol) | 0.47 |
| Total | 99.11 |

The above paint was reduced to a 40 second Fisher No. 2 cup viscosity with a mixture of xylene and ethyl acetate. The reduced paint was electrostatically sprayed 2 passes with a Minibell Electrostatic Spray Gun on a phosphatized steel panel coated with an alkyd resin primer and one pass with a conventional spray gun using air atomization. The painted panel was baked for 30 minutes at about 125° C. The resulting paint had a high gloss, good metallic flake control, a dry paint film thickness of about 2 mils and did not sag or pull away from the edge of the panel.

A second coating of the above paint was sprayed onto a separate phosphatized and primed steel panel and baked as above to provide a film about 4 mils thick which had excellent gloss, good metallic flake control and did not sag or pull away from the edges of the panel.

A paint was prepared using the same constituents and amounts as above except the polyethylene glycol solution was omitted. The paint was reduced to a spray viscosity as above, spray applied as above, onto a separate steel panel phosphatized and primed as above and baked as above, to provide a 2 mil thick finish. The resulting panel had an unacceptable finish because the finish had poor metallic flake control, showed a severe amount of pulling away from the edges of the panel and severe sagging. A thick film (3.5 mils dry film thickness) was applied as above to a separate primed and phosphated steel panel and had the same unacceptable properties including severe sagging of the finish.

EXAMPLE 3

A light blue metallic paint was formulated by blending the following constituents together in the order shown:

| | Parts by Weight |
|---|---|
| Xylene | 2.86 |
| U.V. stabilizer and antioxidant solution (described in Example 2) | 6.05 |
| Butyl acetate | 3.71 |
| Ethylene glycol monobutyl ether | 3.21 |
| Blue Pigment Dispersion (described in Example 2) | 2.04 |
| Blue Pigment Dispersion (12% phthalocyanine blue pigment 48% acrylic polymer, described in Example 1 and 40% methyl amyl lactone) | 0.63 |
| Hydrophilic Silica Dispersion (described in Example 1) | 10.2 |
| Fully methylated/butylated melamine formaldehyde resin | 13.82 |
| Medium Aluminum Flake Dispersion (described in Example 2) | 7.31 |
| Medium Molecular Weight Acrylic Resin Solution (described in Example 2) | 8.92 |
| Iron pyrophosphate dispersion (described in Example 2) | 2.82 |
| Acrylic Resin solution (describedin Example 1) | 29.98 |
| Methanol | 1.05 |
| Butanol | 0.92 |
| Ethyl Acetate | 5.16 |
| Polyethylene glycol solution (described in Example 1) | 0.32 |
| Dimethyl oxazoline solution (65% solids in Methanol) | 0.39 |
| Paratoluene sulfonic Acid solution (33% solids in Methanol) | 0.44 |
| Total | 99.83 |

The above paint was reduced to a 40 second Fisher No. 2 cup viscosity with a mixture of xylene and ethyl acetate. The reduced paint was sprayed as in Example 2 on a phosphatized steel panel coated with an alkyd resin primer and then baked for 30 minutes at about 125° C. The resulting paint had a good gloss, good metallic flake control, a dry paint film thickness of about 2 mils and did not sag or pull away from the edge of the panel.

A second coating of the above paint was sprayed as above onto a separate phosphatized and primed steel panel and baked as above to provide a film about 3.5 mils thick which had good gloss, good metallic flake control and did not sag or pull away from the edges of the panel.

A paint was prepared using the same constituents and amounts as above except the polyethylene glycol solution was omitted. The paint was reduced to a spray viscosity as above, spray applied as above, onto a separate steel panel phosphatized and primed as above and baked as above to provide a 2 mil thick finish. The resulting panel had an unacceptable finish because the finish had poor metallic flake control, showed a severe amount of pulling away from the edges of the panel and sagged. A thick film (3.5 mil dry film thickness) was applied as above to a separate primed and phosphated steel panel and had the same unacceptable properties including excessive sagging.

I claim:

1. A coating composition comprising about 40-70% by weight of a binder of film-forming constituents and about 30-60% by weight of a nonaqueous liquid carrier, wherein the binder comprises a film-forming acrylic polymer containing polymerized alkyl methacrylate and alkyl acrylate monomers and having reactive carboxyl groups, hydroxyl groups, amide groups, glycidyl groups or a mixture of any of these groups and an alkylated melamine formaldehyde crosslinking agent; and in addition the composition contains about 0.1-10% by weight, based on the weight of the binder, of a rheology control additive consisting essentially of about
   (1) 80-99.5% by weight, based on the weight of the rheology control additive, of colloidal hydrophilic fumed silica having a surface area of about 100-500 square meters per gram and a particle size of about 5-20 millimicrons and
   (2) 0.5-20% by weight, based on the weight of the rheology control additive, of polyethylene glycol having a weight average molecular weight of about 6,000-10,000.

2. The coating composition of claim 1 in which the film-forming resin is an acrylic resin comprises an alkyl methacrylate, an alkyl acrylate, a hydroxy alkyl methacrylate or a hydroxy alkyl acrylate, an alkylated melamine formaldehyde resin and contains in addition to the binder about 0.1-2.0%, based on the weight of the binder of an acid catalyst.

3. The coating composition of claim 2 which contains in addition pigment in a pigment to binder weight ratio of about 0.1-30%.

4. The coating composition of claim 3 which contains about 0.1-5% by weight of metallic flake pigment.

5. The composition of claim 4 in which the metallic flake pigment is aluminum flake.

6. The coating composition of claim 3 in which the binder consists essentially of
   (a) about 5-45% by weight of a medium molecular weight acrylic polymer having a number average molecular weight, determined by gel permeation chromotography, of about 5,000-20,000, a hydroxyl content of about 2-10% by weight, a glass transition temperature of about −20° C. to +25° C. and consisting essentially of methyl methacrylate, an alkyl methacrylate or an alkyl acrylate each having 2-18 carbon atoms in the alkyl group and a hydroxyl alkyl acrylate or a hydroxy alkyl methacrylate each having 2-4 carbon atoms in the alkyl group;
(b) about 10-50% by weight of a low molecular weight acrylic polymer having a number average molecular weight determined as above of about 500-7,500, a hydroxyl content of about 2-10% by weight, a glass transition temperature of about $-20°$ C. to $+25°$ C. and consisting essentially of methyl methacrylate or an alkyl methacrylate or an alkyl acrylate each having 2-18 carbon atoms in the alkyl group and a hydroxy alkyl acrylate or a hydroxy alkyl methacrylate each having 2-4 carbon atoms in the alkyl group; and wherein the difference in molecular weight between the acrylic polymers is at least 3000; and (c) about 25-45% by weight of an alkylated melamine formaldehyde cross-linking agent having 1-4 carbon atoms in the alkyl group.

7. The coating composition of claim 6 in which the acrylic polymers contain about 0.1-30% by weight of styrene.

8. The coating composition of claim 6 in which the acrylic polymers consists essentially of
15-82% by weight of methyl methacrylate,
2-50% by weight of an alkyl acrylate having 2-12 carbon atoms in the alkyl group, and
16-35% by weight of a hydroxy alkyl acrylate or a hydroxy alkyl methacrylate, each having 2-4 carbon atoms in the alkyl group.

9. The coating composition of claim 7 in which each of the acrylic polymers consists essentially of
10-20% by weight of styrene,
10-20% by weight of methyl methacrylate,
35-48% by weight of butyl acrylate,
20-30% by weight of hydroxyl ethyl acrylate and
0.1-5% by weight of acrylic acid;
wherein the medium molecular weight acrylic polymer has a number average molecular weight acrylic polymer has a number average molecular weight of about 1,500-4,000.

10. The coating composition of claim 8 or 9 in which the cross-linking agent is methylated/butylated melamine formaldehyde resin.

11. The coating composition of claim 10 in which the catalyst is an alkyl acid phosphate, phosphoric acid, paratoluene sulfonic acid or an adduct of either of said acids.

12. The coating composition of claim 11 in which the catalyst is an adduct of paratoluene sulfonic acid and an alkyl oxazolidine.

13. The coating composition of claim 8 containing about 0.1-10% by weight, based on the weight of the binder, of an ultraviolet light stabilizer.

14. The coating composition of claim 8 containing about 0.1-5% by weight, based on the weight of the binder, of an antioxidant.

15. The coating composition of claim 8 containing about 0.1-10% by weight, based on the weight of the binder, of iron pyrophosphate.

16. The coating composition of claim 1 in which the binder of film-forming resin is a blend of an acrylic resin and a polyester resin and the crosslinking resin is an alkylated melamine formaldehyde resin.

17. A substrate having a cured finish of the composition of claim 1 firmly adhered thereto.

18. A substrate having a color coat of the coating composition of claim 3 and a clear coat firmly adhered to the color coat of the coating composition of claim 1 wherein both the color coat and clear coat are baked to form a cured finish.

* * * * *